United States Patent [19]

Baas

[11] Patent Number: 5,004,274
[45] Date of Patent: Apr. 2, 1991

[54] SNAP RING JOINT ASSEMBLY
[75] Inventor: Kevin R. Baas, Beavercreek, Ohio
[73] Assignee: Price Brothers Company, Dayton, Ohio
[21] Appl. No.: 460,428
[22] Filed: Jan. 3, 1990
[51] Int. Cl.⁵ .............................................. F16L 49/00
[52] U.S. Cl. .................................... 285/288; 24/279; 285/321
[58] Field of Search ................... 24/279; 411/174, 175, 411/104; 285/288, 410, 367, 321, 27

[56] References Cited
U.S. PATENT DOCUMENTS

| | | | |
|---|---|---|---|
| 3,177,019 | 4/1965 | Osweiler | 285/321 |
| 3,317,974 | 5/1967 | Sisler | 24/279 |
| 3,361,403 | 1/1968 | Oeler et al. | 24/279 |
| 3,477,106 | 11/1969 | Tetzlaff et al. | 24/279 |
| 3,776,576 | 12/1973 | Keyser | 285/27 |
| 4,428,604 | 1/1984 | Conner | 285/321 |
| 4,705,078 | 11/1987 | Montgomery | 24/279 |
| 4,718,701 | 1/1988 | Vigneron et al. | 285/321 |

Primary Examiner—Eric K. Nicholson
Attorney, Agent, or Firm—Biebel, French & Nauman

[57] ABSTRACT

A pipe joint is disclosed in which a pipe section having a bell end is joined to a pipe section having a spigot end and in which a split locking ring is provided for preventing the sections from separating. The locking ring may be expanded and contracted by means of a pair of lugs attached to the ends of the ring. A U-shaped nut is positioned on one of the lugs and a threaded fastener passes through each of the lugs and the U-shaped nut for engaging a threaded aperture in the nu to draw the lugs together, and an additional threaded nut is positioned on the fastener between the lugs for forcing the lugs apart.

11 Claims, 4 Drawing Sheets

SNAP RING JOINT ASSEMBLY

BACKGROUND OF THE INVENTION

The present invention relates to a pipe assembly, and more particularly, to a pipe assembly which uses a locking ring to join two pipe sections.

Pressurized pipe lines such as water lines are subjected, as a result of internal pressure and change of direction or size of pipe, to thrust forces which tend to separate the pipe sections from each other. This tendency of the pipe sections to separate is typically resisted through the use of thrust blocks or, alternatively, a harnessed joint may be used.

Harness joints are generally formed with a bell ring located on one pipe section and a spigot ring located on a second pipe section which fits and seals within the bell ring. In addition, some means of holding the bell and spigot rings together are provided.

A typical means of holding the bell and spigot rings together is a split locking ring positioned between the inner face of the bell ring and the outer face of the spigot. A known locking ring arrangement is shown in U.S. Pat. No. 3,776,576 to Keyser and assigned to the assignee of the present application. This patent discloses a locking ring having a pair of lugs which extend through a slot in the bell ring and which are drawn together by a fastener to firmly attach to the spigot ring after the spigot ring is in place within the bell ring. In order to hold the locking ring in an expanded position within the bell ring prior to the spigot ring being received into the bell ring, a spacer block is provided between the lugs on the locking ring to hold the lugs apart by a predetermined amount. Prior to tightening the ring, the fastener passing through the lugs and the spacer block must be removed such that the spacer block may be extracted after which the fastener is replaced to tighten the lugs together and thus contract the locking ring around the spigot ring.

As a result of differences in tolerances in the length of the blocks and the circumferences of the bell and spigot rings as well as in the length of the locking ring, the locking ring is not always expanded to a large enough circumference to permit the locking ring to be fully recessed within the bell ring such that a gasket positioned on the end of a spigot ring entering the bell may catch on exposed edges of the locking ring.

In addition, the block is difficult to work with in field conditions since the fastener must be removed in order to extract the block from between the lugs prior to tightening of the locking ring. Thus, there is a potential for losing the fastener during the fastener removal and installation operation. This is particularly a problem when the ring is located in a limited access area or when the operation must be performed under water.

The spacer block has also proven difficult to work with in situations where the pipe sections must be separated for some reason prior to completing the joint but after the spacer block has been removed. In this type of situation, a special tool must be provided for prying the lugs of the locking ring apart in order to reinsert the block for holding the ring in an expanded position.

Thus, there is a need for a harnessed pipe assembly using a locking ring in which means are provided for maintaining the ring in an expanded position and which do not require removal prior to contracting the ring. Further, there is a need for providing means for conveniently moving the locking ring from a contracted to an expanded position within a bell ring such that a gasket positioned on the end of a spigot ring entering the bell ring may pass into the bell ring without catching on the locking ring.

SUMMARY OF THE INVENTION

The present invention provides a pipe assembly having means for expanding a locking ring to allow a pair of pipe sections to be fit within one another and for contracting the locking ring to hold the pair of pipe sections together.

In a preferred embodiment, a pipe assembly is provided comprising a first pipe section having a first bell end portion for receiving a second spigot end portion of a second pipe section. A split locking ring having spaced ends is located within the bell portion of the first pipe section for engaging an outer wall of the spigot end of the second pipe section.

The bell end of the first pipe section includes a slot extending through a portion of the circumference of the bell. Each end of the locking ring has a lug attached thereto and each of the lugs extend outwardly through the slot.

Actuating means are provided for drawing the spaced ends of the locking ring together into a locked position and for forcibly moving the spaced ends apart into an unlocked position.

In the preferred embodiment, the actuating means includes a U-shaped nut which surrounds an end of one of the lugs. Each of the lugs include means defining a hole therethrough and the U-shaped nut includes means defining a pair of apertures which are aligned with the hole in one of the lugs. One of the apertures in the U-shaped nut is threaded and a fastener passes through the holes in the lugs and the U-shaped nut to engage the threaded aperture in the nut such that the spaced ends of the locking ring may be drawn together by rotation of the threaded fastener.

An additional nut is provided on the fastener and is located between the lugs and opposite from the lug which is surrounded by the U-shaped nut. The second nut may be used to forcibly move the spaced ends of the locking ring apart and to lock the fastener against rotation by rotating the second nut on the fastener in a direction which causes it to move away from the U-shaped nut.

Also in the preferred embodiment, means are provided for bridging the space between the spaced ends of the locking ring in order to facilitate passage of a gasket positioned on the end of the spigot ring of the second pipe section past the edges of the locking ring. The means for bridging the space is preferably a clip formed of a deformable material surrounding a portion of the ring ends which may bend to conform to the circumference of the second pipe section as the locking ring is tightened down.

Thus, the pipe assembly of the present invention provides a convenient means for tightening the locking ring without requiring the removal of any parts prior to the tightening being performed. In addition, means are incorporated on the locking ring for facilitating expansion of the ring without requiring the use of special tools for prying the lugs of the ring apart.

Other objects and advantages of the invention will be apparent from the following description, the accompanying drawings, and the appended claims.

DESCRIPTION OF THE PREFERRED EMBODIMENTS

The pipe assembly of the present invention is formed as a harnessed joint incorporating bell and spigot pipe sections and a locking ring similar to that disclosed in U.S. Pat. No. 3,776,576 assigned to the assignee of the present application, and which is incorporated herein by reference.

Figure 1:
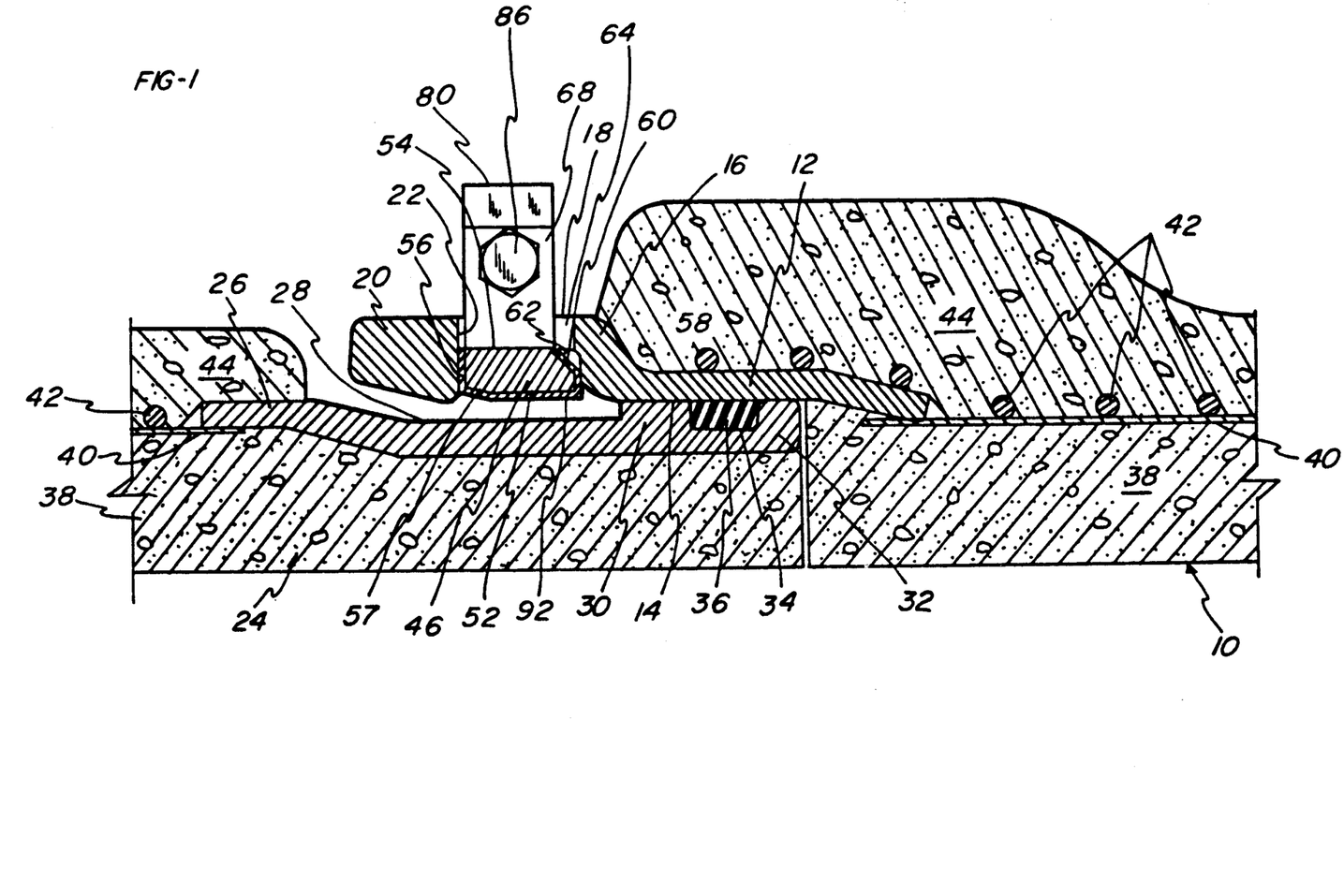
FIG. 1 is a cross sectional view through a portion of the pipe assembly taken longitudinally of the pipe line with the locking ring in its expanded condition.
Figure 2:
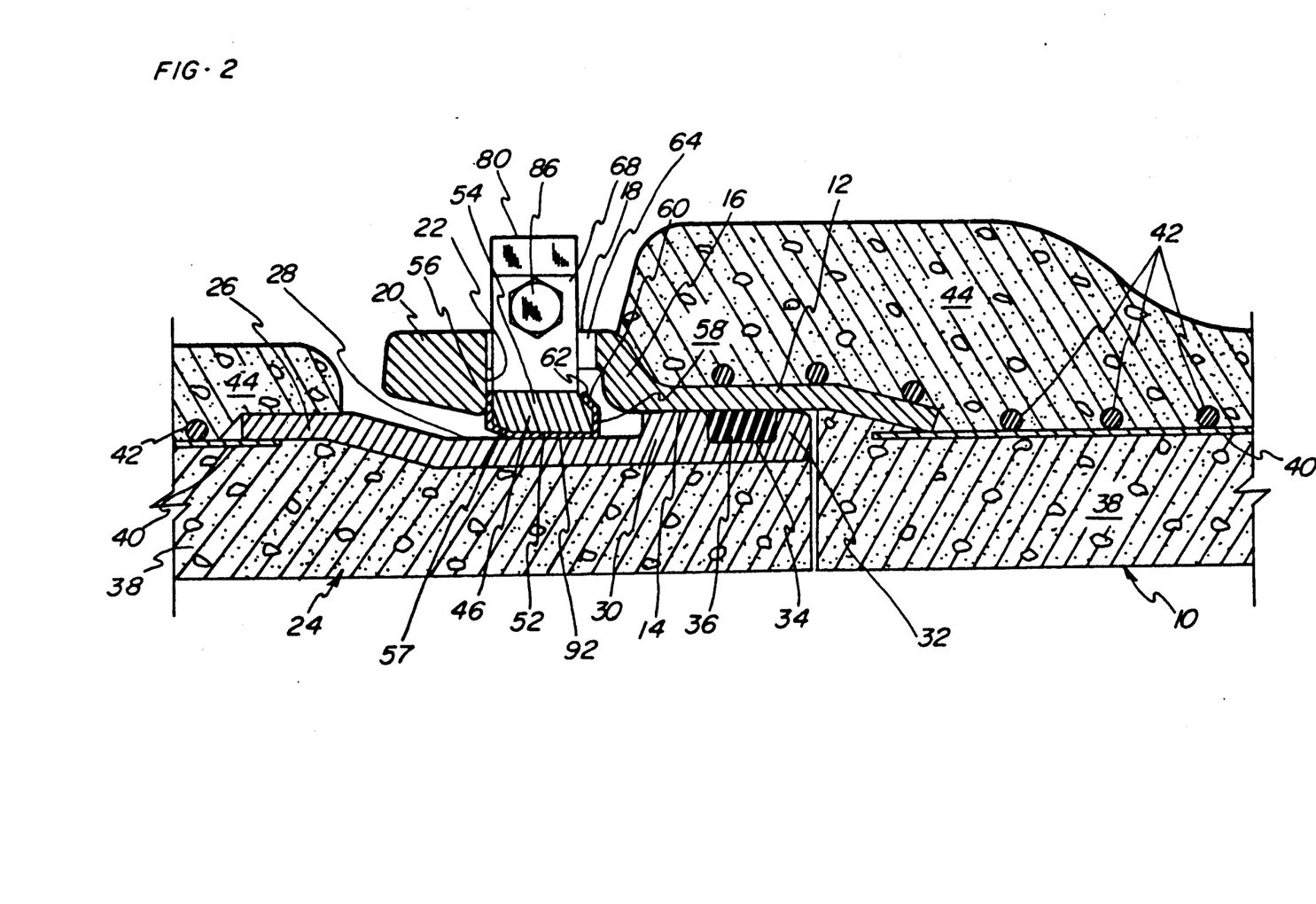
FIG. 2 is a similar view to FIG. 1 showing the completed joint with the locking ring in its contracted position.

Referring to FIGS. 1 and 2, the pipe assembly of the present invention includes a first pipe section 10 having a bell ring 12 located at one end thereof. The bell ring 12 includes an inner face 14 proximate to the end of the first pipe section 10 which defines a first inner circumference of the bell ring 12.

A shoulder portion 16 of the bell ring 10 extends axially and radially outwardly from the inner face 14 of the bell ring 12 and supports a connecting portion 18 of the bell ring 12 which extends axially from the shoulder portion 16. The connecting portion 18 of the bell ring 12 is oriented substantially parallel to the inner face 14 of the bell ring 12 and supports a wall portion 20 located at an end of the bell ring 12 axially distal from the first pipe section 10.

The wall portion 20 includes a surface 22 which faces inwardly toward the first pipe section 10 and which extends radially inwardly from the connecting portion 18. The inwardly facing surface 22 terminates at a second inner circumference of the bell ring 12 which is radially inwardly spaced from the connecting portion 18.

The pipe assembly further includes a second pipe section 24 having a spigot ring 26 located at one end thereof. The spigot ring 26 includes an outer face 28 which defines a first outer circumference of the spigot ring 26 which is smaller than the first and second inner circumference of the bell ring 12.

First and second annular ribs 30, 32 are located on an end of the spigot ring 26 and define an annular groove 34 therebetween. The annular ribs 30, 32 have ends which are radially distal from the outer face 28 of the spigot ring 26 and which each define a circumference of the spigot ring 26 which is smaller than the first and second inner circumference of the bell ring 12.

A compressible annular gasket 36 is positioned on the spigot ring 26 within the annular groove 34 and has an outer circumference in its uncompressed state which is greater than the outer circumference of either of the first and second annular ribs 30, 32. In addition, the outer circumference of the annular gasket 36 is also greater than the first inner circumference of the bell ring 12 such that the gasket 36 forms a tight fit with the inner wall 14 when the spigot ring 26 is positioned within the bell ring 12.

It should be noted that each of the pipe sections may be of a prestressed cylinder type, including a concrete core 38, a steel cylinder 40, prestressing wires 42 wound about the steel cylinder 40 and a mortar coating 44. However, the present invention may be adapted for use with other types of pipes as well.

Figure 3:
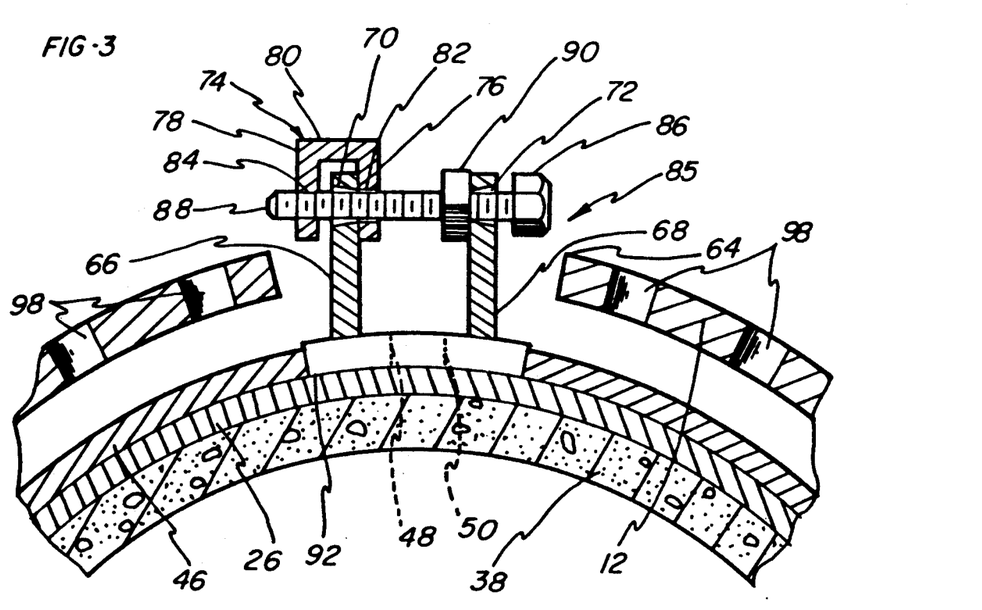
FIG. 3 is a cross-sectional view taken transversely of the pipe line at the location of the split in the locking ring and showing the locking ring being expanded.
Figure 4:
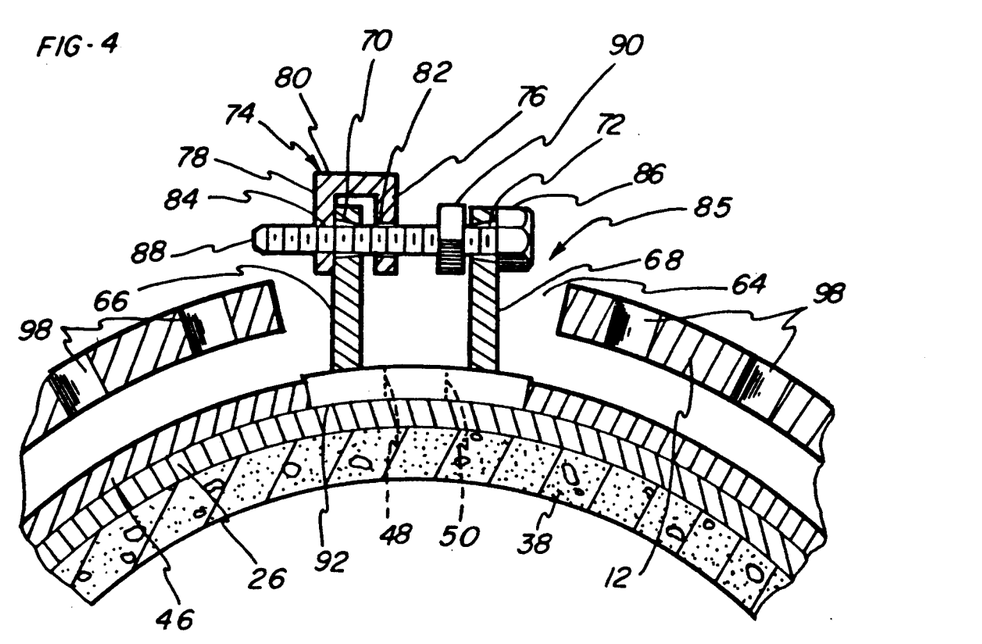
FIG. 4 is a cross-sectional view taken transversely of the pipe line at the location of the split in the locking ring and showing the locking ring being contracted.
Figure 5:
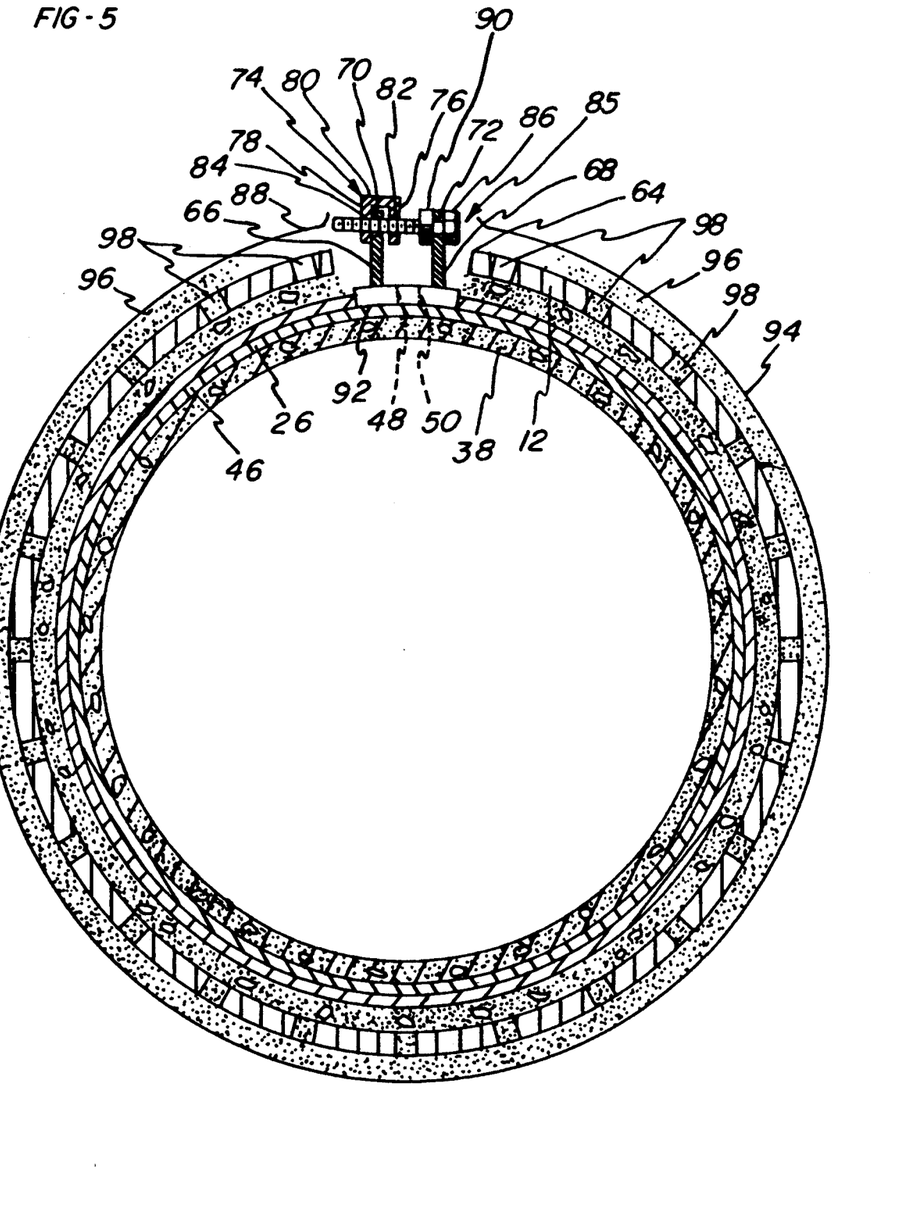
FIG. 5 is a cross-sectional view of a partially assembled joint taken transversely of the pipe line.

A split, circumferentially expandable and contractible locking ring 46 is positioned between the connecting portion 18 of the bell ring 12 and the outer face 28 of the spigot ring 26. As can be seen in FIGS. 3–5, the locking ring 46 is provided with first and second spaced ends 48, 50.

Referring again to FIGS. 1 and 2, the locking ring 46 includes an inner wall 52 and an outer wall 54 spaced from and oriented substantially parallel to the inner wall 52. A first bearing wall 56 extends radially from the inner wall 52 to the outer wall 54 such that the first bearing wall 56 is positioned opposite to the inwardly facing surface 22 of the bell ring wall portion 20. The first bearing wall 56 is connected to the inner wall 52 by an inner beveled surface 57 which extends radially and axially outwardly from the inner wall 52.

A second bearing wall 58 is located on an axially opposite side of the ring 46 from the first bearing wall 56 and extends radially outwardly from the inner wall 52. The second bearing wall 58 is positioned opposite from the first annular rib 30 on the spigot ring 26. An outer beveled surface 60 extends radially outwardly from the second bearing wall 58 toward the outer wall 54 and is joined to the outer wall 54 by a stepped wall 62.

It should be noted that the structure of the bell ring 12, spigot ring 26 and locking ring 46 thus far described is substantially similar in structure and operation to the pipe assembly structure shown in U.S. Pat. No. 3,776,576.

Referring again to FIGS. 3–5, the bell ring 12 is further provided with means defining a slot 64 through the connecting portion 18. First and second lugs 66 and 68 are attached to the first and second ends 48, 50 of the locking ring 46, respectively, and extend through the slot 64 in the connecting portion 18 of the bell ring 12. Each of the lugs 66, 68 includes means defining a hole 70, 72 therethrough.

A first U-shaped nut 74 is positioned on the first lug 66 and is provided with first and second legs 76, 78 oriented and substantially parallel to each other and a base portion 80 connecting the legs 76, 78. The base portion 80 extends across an outer end of the first lug 66 such that the first leg 76 extends between the first and second lugs 66, 68, and the second leg 78 is positioned on an opposite side of the first lug 66 from the first leg 76 whereby the legs 76, 78 extend across opposing sides of the hole 70 in the first lug 66.

The legs 76, 78 are provided with means defining first and second apertures 82, 84, respectively, which are aligned with the hole 70 in the first lug 66. The second aperture 84 in the U-shaped nut 74 is threaded and the first aperture 82 is formed with a smooth interior surface such that a fastener 85 having a head portion 86 and a threaded shank portion 88 may freely pass through the first and second lugs 66, 68 and the first aperture 82 to engage the threaded aperture 84 whereby rotation of the threaded shank 88 causes the lugs 66, 68 to be drawn toward each other. The base portion 80 contacts and cooperates with the outer end of the first lug 66 to prevent the nut 74 from rotating with the threaded shank 88, while permitting the nut 74 to pivot slightly about an axis parallel to the longitudinal axis of the pipes to compensate for the changing angular relationship between the lugs 66, 68 as the circumference of the ring 46 is increased or decreased.

A second nut 90 is positioned on the threaded shank 88 between the U-shaped nut 74 and the second lug 68. The second nut 90 may be used to forcibly move the lugs 66, 68 apart to expand the locking ring 46. As seen in FIG. 3, the head 86 of the threaded fastener 85 may be located at a position spaced from the lug 68 and then the second nut 90 may be rotated such that it moves away from the lug 66, the leg 76 of the U-shaped nut 74 will cooperate with the nut 90 in pushing the lugs 66 and 68 away from each other to force the locking ring 46 into an expanded position. The nut 90 may be rotated until the lug 68 is firmly engaged on either side by the nut 90 and the head 86 of the fastener 85 such that the fastener 85 is prevented from rotating and the ring 46 is locked in its expanded position.

As can be seen in FIG. 1, when the locking ring 46 is expanded, it is located within a recess in the bell ring 12 formed by the inwardly facing surface 22, the shoulder portion 16 and the connecting portion 18. Thus, as the spigot ring 26 enters the bell ring 12, the gasket 36 positioned on the end of the spigot ring 26 will pass through without catching on the locking ring 46. In addition, the inner beveled surface 57 on the locking ring 46 further facilitates guiding of the spigot ring 26 past the locking ring 46 without damage to the gasket 36, which might result if the gasket 26 were to catch on an edge of the locking ring 46.

When it is desired to move the ring 46 from its expanded position to a contracted position in locking contact with the spigot ring 26, the second nut 90 may be loosened approximately an eighth of a turn away from the lug 68 such that the shank portion 88 of the fastener will be free to rotate and draw the head portion 86 and the U-shaped nut 74 together. Referring to FIG. 4, as the shank portion 88 of the fastener 85 is rotated, the head portion 86 and the second leg 78 cooperate with the lugs 66, 68 to draw the ends 48, 50 of the ring 46 together to move the ring 46 into its contracted position.

The locking ring 46 is further provided with a clip 92 formed of a deformable material such as 24 gauge steel sheet material which surrounds a portion of the ends 48, 50 of the locking ring 46. The clip 92 extends between the first and second spaced ends 48, 50 of the locking ring and extends over and conforms to portions of the inner wall 52, inner beveled surface 57, first bearing wall 56, second bearing wall 58, and outer beveled surface 60 and acts to separate the spaced ends of the locking ring 46 from the spigot ring 26. Thus, the clip 92 prevents the gasket 36 positioned on the end of the spigot ring 26 from catching on the edges of the spaced ends 48, 50 as the gasket 36 enters the bell ring 12. As the locking ring 46 is tightened around the spigot ring 26 the deformable clip 92 is caused to bend and to conform to the circumference of the outer face 28.

After the locking ring 46 is moved to its locked position, the first bearing wall 56 will be in position to abut the inwardly facing surface 22 of the bell ring 12 and the second bearing surface 58 will be in position to limit axial movement of the first annular rib 30 and thereby prevent the spigot ring 26 from moving axially away from the bell ring 12.

The joint is completed by attaching a conventional diaper 94 of flexible material circumferentially around each of the pipe sections on opposite sides of the joint and filling the diaper 94 with grout 96 to form an outer layer of grout 96 around the joint (see FIG. 5). In addition, the bell ring may be formed with openings 98 such that the grout will flow in around the outer surfaces of the ring 46 to help distribute the load between the ring 46 and cooperating portions of the bell and spigot rings.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A pipe assembly comprising:
   a first pipe section having a first end portion for receiving a second end portion of a second pipe section to be connected to said first pipe section, wherein the outer circumference of said second end portion is smaller than the inner circumference of said first end portion;
   a split locking ring having first and second spaced ends, said locking ring being located within said first end portion for engaging and locking said second end portion of a second pipe section located within said first end portion to said first pipe section;
   a slot formed in said first end portion;
   a first and second lug attached to respective ones of said first and second ends of said locking rings, each said lug extending through said slot and including means defining a hole in an end of each of said lugs;
   a fastener extending through said holes in said lugs, said fastener having a lead and a threaded shank;
   a U-shaped nut having first and second legs and a base portion connecting said legs, said legs extending radially inwardly from and on either side of an end of a first one of said lugs such that said first leg is located between said lugs;
   means defining an aperture in each of said legs, said aperture in one of said legs including threads and said threaded shank passing through said apertures and engaging said threads in said one leg;
   a second threaded nut located on said threaded shank between said first and second lugs; and
   wherein said second nut may be rotated about said threaded shank to cause said nut to engage said second lug and said first leg to engage said first lug whereby said first and second ends of said locking ring are pushed apart, and said threaded shank may be rotated to cause said fastener head to engage said second lug and said second leg to engage said first lug whereby said first and second ends of said locking ring are drawn together.

2. The pipe assembly of claim 1 wherein said first end portion includes a slot and each end of said locking ring has a lug attached thereto such that each of said lugs extend through said slot.

3. The pipe assembly of claim 2 wherein said actuating means comprises a threaded fastener.

4. The pipe assembly of claim 3 wherein said lugs include means defining a hole in each of said lugs and said threaded fastener passes through said holes.

5. The pipe assembly of claim 4 wherein said actuating means further comprises a U-shaped nut which surrounds an end of one of said lugs, said U-shaped nut including means defining a pair of apertures, wherein one of said apertures is threaded and engages with said threaded fastener such that said spaced ends of said locking ring may be drawn together and moved apart by rotation of said threaded fastener.

6. The pipe assembly of claim 1 wherein connecting means are provided for bridging the space between said spaced ends of said locking ring.

7. The pipe assembly of claim 6 wherein said connecting means is in the form of a deformable clip surrounding a portion of said locking ring to separate said spaced ends of said locking ring from said second end portion of said second pipe section as it enters said first pipe section.

8. The pipe assembly of claim 7 wherein said clip conforms to the shape of the outer circumference of said second pipe section as said ring is drawn into said locked position.

9. A pipe assembly comprising:
   a first pipe section having a bell ring located at one end thereof, said bell ring having an inner face proximate to said end of said first pipe section defining a first inner circumference of said bell ring;
   a shoulder portion extending axially and radially outwardly from said inner face of said bell ring;
   a connecting portion extending axially from said shoulder portion and oriented substantially parallel to said inner face of said bell ring;
   a wall portion located at end of said bell ring axially distal from said end of said first pipe section and extending radially inwardly from said connecting portion, said wall portion having an axially inwardly facing surface terminating at a second inner circumference of said bell ring radially inwardly spaced from said connecting portion;
   a second pipe section having a spigot ring located at one end thereof, said spigot ring having an outer face defining a first outer circumference of said spigot ring smaller than said first and second inner circumference of said bell ring;
   first and second annular ribs projecting radially outwardly from said spigot ring adjacent an end axially distal from said end of said second pipe section and having a radially distal end terminating at a second outer circumference of said spigot ring smaller than said first and second inner circumference of said bell ring, said ribs defining an annular groove on said spigot ring;
   a compressible annular gasket positioned in said annular groove, said annular gasket having an outer circumference in its uncompressed state which is greater than said second outer circumference of said spigot ring;
   a split, circumferentially expandable and contractible locking ring positioned between said connecting portion of said bell ring and said outer face of said spigot ring, said locking ring having first and second spaced ends;
   spaced substantially parallel inner and outer walls on said locking ring;
   an inner beveled surface extending from said inner wall radially outwardly toward said outer wall;
   a first bearing wall extending from said inner beveled surface to said outer wall, said first bearing wall being positioned opposite to said inwardly facing surface of said bell ring wall portion;
   a second bearing wall extending radially outwardly from said inner wall, and being positioned opposite to said first annular rib on said spigot ring;
   an outer beveled surface extending radially outwardly from said second bearing wall toward said outer wall;
   a stepped wall joining said outer bevelled surface and said outer wall;
   means defining a slot in said connecting portion of said bell ring;
   first and second lugs attached to said first and second ends of said locking ring, respectively, and extending through said slot in said bell ring;
   means defining a hole in each of said first and second lugs; a first U-shaped nut positioned on said first lug, said nut having first and second legs oriented substantially parallel to each other and a base portion connecting said legs;
   said base portion extending across and contacting an outer end of said first lug;
   said first leg extending between said first and second lugs and said second leg positioned on an opposite side of said first lug from said first leg such that said legs extend across opposing sides of said hole in said first lug;
   means defining an aperture in each of said legs, each of said apertures being aligned with said hole in said first lug;
   a fastener having a head and a shank portion, said shank portion having threads along the length thereof, said fastener extending through said holes in said lugs and through said apertures in said legs, one of said apertures having threads engaging said threads on said fastener;
   a second nut positioned on said fastener between said first nut and said second lug, said second nut having threads engaging said threads on said fastener such that upon rotating said second nut, said second lug may be forced away from said first lug;
   a deformable clip positioned over said locking ring and extending between said first and second spaced ends, said clip extending over portions of said inner wall, inner beveled surface, first bearing wall, second bearing wall, and outer beveled surface of said locking ring and acting to separate said spaced ends of said locking ring from said spigot ring;
   said fastener and said first and second nuts cooperating to force said lugs apart in an unlocked position of said locking ring wherein said inner wall of said ring has a circumference greater than said first and second circumference of said spigot ring;
   said fastener and said first nut cooperating to force said lugs together in a locked position of said locking ring wherein said locking ring is contracted to grip said outer face of said spigot ring and said first and second bearing walls of said locking ring are positioned to abut said inwardly facing surface of said wall portion of said bell ring and said first annular rib of said spigot ring, respectively, and thereby prevent relative axial movement between said first and second pipe sections.

10. A pipe assembly comprising:
   a first pipe section having a first end portion for receiving a second end portion of a second pipe section to be connected to said first pipe section, wherein the outer circumference of said second end portion is smaller than the inner circumference of said first end portion;

a split locking ring having spaced ends, said locking ring being located within said first end portion for engaging and locking said second end portion of a second pipe section located within said first end portion to said first pipe section;

actuating means for drawing said spaced ends of said locking ring together into a locked position and for forcibly moving said spaced ends apart into an unlocked position; and a deformable clip bridging the space between said spaced ends and surrounding a portion of said locking ring, said clip being positioned between said spaced ends and said second pipe section whereby said clip separates said spaced ends from said second end portion as said second pipe section enters said first pipe section.

11. The pipe assembly of claim 10 wherein said clip conforms to the shape of the outer circumference of said second pipe section as said ring is drawn into said locked position.

* * * * *

UNITED STATES PATENT AND TRADEMARK OFFICE
CERTIFICATE OF CORRECTION

PATENT NO. : 5,004,274
DATED : April 2, 1991
INVENTOR(S) : Kevin R. Baas

It is certified that error appears in the above-identified patent and that said Letters Patent is hereby corrected as shown below:

Column 6, line 62, claim "2." should be claim --6.--, and "1" should be --5--; line 62, claim "3." should be claim --7.--, and "2" should be --6--; line 64, claim "4." should be claim --8.--, and "3" should be --7--; line 67, claim "5." should be claim --9.--, and "4" should be --8--.

Column 7, line 7, claim "6." should be claim --2.--; line 10, claim "7." should be claim --3.--, and "6" should be --2--; line 16, claim "8." should be claim --4.--, and "7" should be --3--; line 20, claim "9." should be claim --1.--.

UNITED STATES PATENT AND TRADEMARK OFFICE
CERTIFICATE OF CORRECTION

PATENT NO. : 5,004,274

DATED : April 2, 1991

INVENTOR(S) : Kevin R. Baas

It is certified that error appears in the above-identified patent and that said Letters Patent is hereby corrected as shown below:

Column 8, line 15, "a first" should begin a new sub-paragraph; line 62, claim "10." should be claim --5.--.

Column 10, line 7, claim "11." should be claim --10.--, and "10" should be --5--.

Signed and Sealed this

Twenty-ninth Day of September, 1992

Attest:

DOUGLAS B. COMER

*Attesting Officer*   *Acting Commissioner of Patents and Trademarks*